United States Patent
Rosenkranz et al.

(10) Patent No.: US 7,469,816 B2
(45) Date of Patent: Dec. 30, 2008

(54) DIGITAL MEDIA MAILER

(75) Inventors: Thomas H. Rosenkranz, Dover Plains, NY (US); Russell W. Holbrook, Southbury, CT (US); Egbert E. Most, Southbury, CT (US); Harvey Halperin, Kiamesha, NY (US); Peter Faucetta, New York, NY (US)

(73) Assignees: Pitney Bowes Inc., Stamford, CT (US); Newline Noosh, Inc., New York, NY (US)

( * ) Notice: Subject to any disclaimer, the term of this patent is extended or adjusted under 35 U.S.C. 154(b) by 656 days.

(21) Appl. No.: 11/246,984

(22) Filed: Oct. 7, 2005

(65) Prior Publication Data
US 2007/0080196 A1    Apr. 12, 2007

(51) Int. Cl.
B65D 27/06    (2006.01)
B65D 27/04    (2006.01)

(52) U.S. Cl. ................. 229/303; 229/304; 229/305; 229/71

(58) Field of Classification Search ......... 229/303–305, 229/301, 71; 206/308.1
See application file for complete search history.

(56) References Cited

U.S. PATENT DOCUMENTS 2,681,175 A * 6/1954 David ..................... 229/75
6,612,484 B2 * 9/2003 Rawlings et al. ............ 229/305
6,951,279 B2 * 10/2005 Hodess et al. ............... 206/313
2005/0224566 A1 * 10/2005 Butler ........................ 229/301
2006/0049069 A1 * 3/2006 Perrone et al. ........... 206/308.1
2008/0103940 A1 * 5/2008 Rosenkranz ................. 705/28
2008/0120202 A1 * 5/2008 Rosenkranz et al. .......... 705/28

* cited by examiner

Primary Examiner—Jes F Pascua
(74) Attorney, Agent, or Firm—Michael J. Cummings; Angelo N. Chaclas

(57) ABSTRACT

A mailer primarily composed of three layers, or sheets, that are fastened on top of one-another. A back sheet forms the back of both the outgoing and return mail pieces. The back sheet includes the reclosable flap and further includes an opening to allow external viewing of an identification code marked on a media sleeve that is placed in the finished mailer. A second sheet is a middle sheet fastened on top of the back sheet. The middle sheet also has an opening, and is attached to the back sheet such that the middle sheets opening aligns with the back sheet opening. A disk receiving slot is formed between the back sheet and the middle sheet. The aligned openings in the back and middle sheets are located in a center of the disk receiving slot. A third top sheet is removably attached on top of the middle sheet. The top sheet includes delivery markings for original mailing portion of the mailer. The closing flap of the back sheet folds into a closed position over the top sheet and the middle sheet to seal a completed two-way mailer.

19 Claims, 10 Drawing Sheets

DIGITAL MEDIA MAILER

TECHNICAL FIELD

The present invention relates to a mailer envelope configured for sending and returning digital media disks by mail.

BACKGROUND OF THE INVENTION

Combination envelopes that can carry an item from a sender to a recipient and back to the sender, are used in several business contexts. For example, in the context of invoicing and payment, multiple-folded envelopes have been used in which an invoice is affixed by a perforation to a reply envelope. The invoice is folded over and sealed to form a closed sending envelope and an adhesive strip is provided adjacent to the reply envelope. When the customer receives such an envelope or "piece," the customer opens the piece, detaches the invoice, inserts a check for payment in the reply envelope, affixes the adhesive strip, and dispatches the sealed envelope in the mail.

The development of the Digital Versatile Disc ("DVD") as a medium for carrying digital movie and video information has led to a new rental business models that use postal mail for media transport. For example, U.S. Pat. No. 6,584,450, Method and Apparatus for Renting items, describes a DVD rental service in which a subscriber establishes an online "pick list" of DVD movies that the subscriber wishes to rent. When a selected one of the DVD movies on the pick list becomes available in inventory, the service mails the selected DVD movie to the subscriber. The subscriber views the DVD and returns it to service by mail. When the DVD is received by the service, the subscriber is entitled to receive another available DVD from the pick list.

In this context, however, problems can be encountered as the DVD passes through the postal delivery system. The packaging used to convey the DVD from the service to the customer passes through the high-speed automatic sorting equipment at postal facilities. Further, the packaging used to convey the DVD from the customer to the service passes through high-speed automatic cancellation equipment at postal facilities, during which a postal cancellation mark is applied to the packaging. Because DVD's are manufactured from relatively brittle plastic material, and because the cancellation marks are applied with considerable force, a percentage of DVD's passing through the postal system in this manner are subject to damage, breakage or mutilation. In some cases, the mailer known in the art may not be compatible with automated postal facility equipment. This incompatibility generates additional problems because delays in delivery occur as a consequence of the extra time required to sort the mailers manually.

Another problem relating to two way mailers concerns convenience. Customers of rental approaches, such as the DVD approach described above, demand convenience. When an item is sent to the customer, the customer expects to receive some form of postpaid return packaging with the item. Sending the return packaging separately is not practical or convenient. Accordingly, in this field there is a need for a packaging system in which a sending package and a return package are provided concurrently. Furthermore, customers need a two way mailer with an easy use design. Problems arise when the insertion of the media is too time consuming or difficult for the consumer. Customers require a quick and reliable turn-around time for receipt and return of items.

In the conventional service, much of the work in receiving returned DVD's and sending out new DVD's to customers is done manually. For example, an envelope containing a returned DVD is opened by hand by workers employed by the service. The worker manually scans a code on the DVD packaging to identify the returned DVD and the customer. Some of the returned DVD's will be returned to inventory, however many of the returned DVD's will need to be sent to other customers. The returned DVD's are then manually processed again to determine which are need to be resent to customers, and which should be kept for internal storage or processing. Finally, outgoing DVD's are manually inserted into conventional mailers to be placed for outgoing delivery with the postal or delivery service. To maintain customer satisfaction, rapid processing of these incoming and outgoing DVD's is critical. The extensive manual processing of returned and outgoing DVD's can be time that makes quick and reliable turn-around more difficult.

Based on the foregoing, there is a need for a way to package a fragile or breakable item for transport in the postal system from one party to another in a manner that allows for running through automated equipment and that protects the item from damage, breakage or mutilation. The solution should provide convenience to customers of rental media. Also, the solution should include features to enhance speed and productivity in processing incoming and outgoing digital media at a media handling facility.

Others have tried to solve the problem by including laminated leading edges of a thickness great enough to ensure the postal cancellation equipment does not come into direct contact with the pocket carrying the breakable object. In these mailers, the DVD is close to the leading edge when the mailer is sent from the sender and close to the trailing edge when the mailer is sent from the recipient. However, the added dimensions of the laminated leading edge results in mailers unable to meet the postal services regulations for first class automatable letters. Because the two way mailers known in the art do not meet first class automatable letters standards, they face an increased postal charge of up to 20%. Furthermore, if mailers are not sent via first class, delivery of the mailer may be delayed. These delays in delivery can be problematic in competitive markets, as customers generally demand quick turn around and on-time delivery from companies renting products such as DVD's. Currently, in the United States Postal Service requires that mailers have a maximum height of 6⅛ inches, maximum length of 11½ inches and maximum thickness of ¼ inch in order to qualify for first class automation discounts. The cutoff weight for the most favorable rate for the first class automatable delivery is 1 ounce or less.

With the large cost discrepancies between types of two way mailers, the cost of the postage that is incurred by providing customers with the convenience of a return envelope in a rental approach is a major concern to businesses. The average weight of an item such as a DVD in a protective sleeve is approximately 0.58 ounces. On one level, favorable postage rates are achieved when the total weight of the DVD, its protective sleeve, a sending package, and a return package are equal to or less than one once. Thus, there is a need for a packaging approach that solves all the foregoing problems and continues to have an average weight of one once or less that passes the United States Postal Services requirements for the most favorable rate for first class automatable mail.

Some of the issues described above have been addressed in a co-pending U.S. patent application Ser. No. 10/937,108, Two-Way Electronic Media Mailer, filed Sep. 9, 2004, which is hereby incorporated by reference in its entirety.

SUMMARY OF THE INVENTION

The present invention overcomes disadvantage of the conventional methods and systems by providing a two-way mailer that is suitable for handling by postal service systems and machinery, and that allows enhanced speed and productivity for a service receiving returned digital media and sending digital media to its customers. The recurring example in this description refers to DVD's, however the invention is equally applicable to other digital media such as Compact Disks (CD's), CD-ROM's, video game disks, or the like.

The new mailer is primarily composed of three layers, or sheets, that are fastened on top of one-another. In the preferred embodiment, the sheets are separate and are held together with adhesive to form the respective layered structures. It should also be understood, however, that the mailer may be formed by folding and fastening less than three sheets, or more than three sheets.

A first sheet for forming the mailer is a back sheet. This sheet forms the back of both the outgoing and return mail pieces. The back sheet includes the reclosable flap for sealing both the original outgoing mail piece and the return mail piece. The back sheet further includes an opening to allow external viewing of an identification code marked on a media sleeve that is placed in the finished mailer.

A second sheet is a middle sheet fastened on top of the back sheet. The middle sheet also has an opening, and the middle sheet is attached to the back sheet such that the middles sheet opening aligns with the back sheet opening. A disk receiving slot is formed between the back sheet and the middle sheet. The disk receiving slot is dimensioned to snugly enclose the digital media disk. The aligned openings in the back and middle sheets are located in a center of the disk receiving slot. A top, outward facing, face of the middle sheet includes return mail markings for the return portion of the mailer.

A third top sheet is removably attached on top of the middle sheet. The top sheet includes delivery markings for original mailing portion of the mailer. The closing flap of the back sheet folds into a closed position over the top sheet and the middle sheet to seal a completed two-way mailer. The top sheet is preferably removably attached to the middle sheet by adhesive regions located around outer regions between the top and middle sheets. When it is time to return the two-way mailer, a user can pull away the top sheet to expose return markings on the middle sheet.

In the preferred embodiment, the back sheet, the middle sheet and the top sheet are comprised of separate sheets. To form the disk receiving slot, the middle sheet is adhered to the back sheet along adhesive regions at a left side and along a right side of the mailer. The disk receiving slot is thus formed by an unadhered space between the back and middle sheets and between left and right adhesive regions.

The mailer is further used in conjunction with a digital media sleeve for enclosing the digital media disk. The disk receiving slot of the mailer is dimensioned to receive the generally square shaped sleeve. The sleeve has an identification code printed on a front center and a back center of the sleeve. Thus the identification code on the sleeve is positioned so as to be visible through both the back sheet opening and the middle sheet opening when the sleeve is placed within the disk receiving slot. This arrangement of the openings and sleeve allows that the code will be visible through the openings regardless of the rotational orientation of the sleeve within the pocket. Thus, the arrangement simplifies a step of inserting the DVD in the pocket, both for the service, and for the customer.

In the preferred embodiment, the identification code is a barcode that indicates content of the digital media. The sleeve may further include plain text information indicating content of the digital media.

In a further preferred embodiment, the top sheet includes a top sheet opening. The top sheet opening overlaps with the middle sheet opening when the top sheet is attached over the middle sheet. However, the top sheet opening is larger than the middle sheet opening and further allows access to an reply address region on the middle sheet. By allowing access to the reply address region on the middle sheet, variable reply addresses can be printed on the middle sheet at the time the mailer is being prepared to be sent out. After variable reply address information is printed in the reply address region, a delivery address label is attached to the top sheet over the top sheet opening. The delivery address label includes the address for initial delivery of the mailer.

In further embodiments, the back sheet and the middle sheet of the mailer can be made from a single sheet that is folded and adhered so that the middle sheet lies on top of back sheet. The top sheet may also be formed from the single sheet and the top sheet shares an edge with the middle sheet so that the top sheet can be folded and adhered so that the top sheet lies on top of the folded and adhered middle sheet.

Further details of the present invention are provided in the accompanying drawings, detailed description, and claims.

DETAILED DESCRIPTION

The preferred embodiment of the new digital media mailer is composed of three sheets fastened on top of one another in three layers. While the preferred embodiment uses separate and distinct sheets for its layers, the term "sheets" should also be understood to mean parts of a single sheet that have been folded to form the layers that comprise the mailer.

In this application, certain elements of the two-way mailer may be relevant for different stages in the use of the mailer. These stages will be referred to as "initial" or "outgoing" stage for the delivery of the media from the service to the customer. A "return" or "incoming" stage refers to the part of the process when the customer is returning the digital media to the service. Certain features of the invention are directed to assisting to quickly transition a DVD from an incoming stage from one customer, to an outgoing stage for another customer.

Figure 1A:
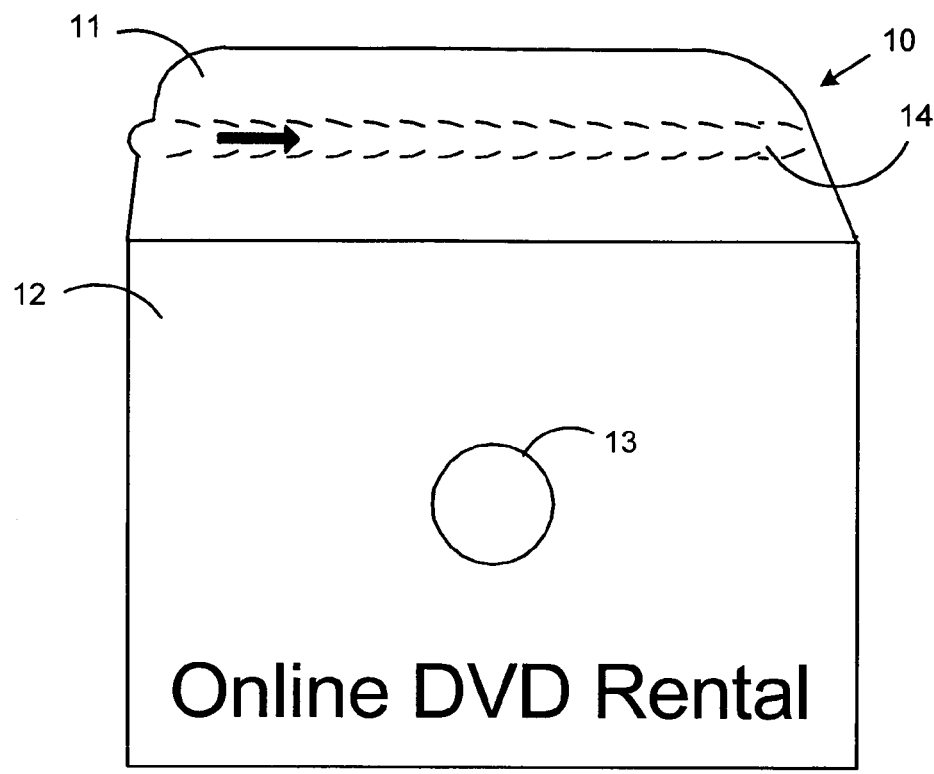
FIGS. 1A and 1B depict an exemplary back sheet for forming a two-way mailer.
Figure 1B:
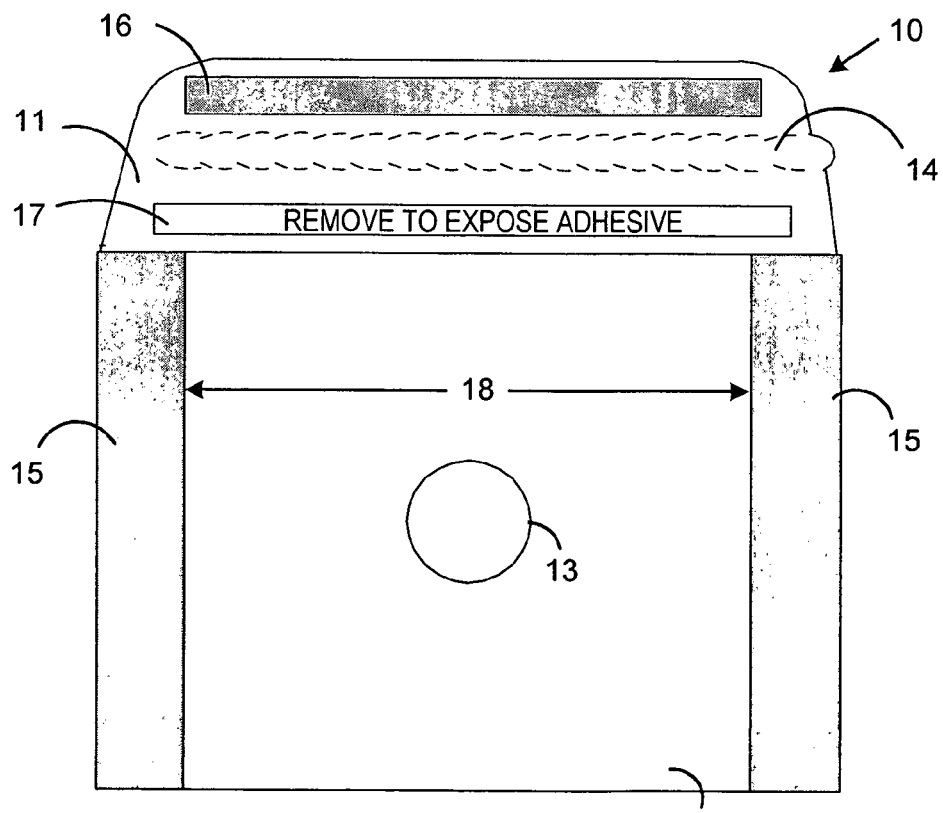

FIGS. 1A and 1B depict a back sheet 10 that forms a base for constructing the two-way mailer. FIG. 1A shows a rear view of the back sheet 10. The back surface shown in FIG. 1A will be the back side of the envelope for both the outgoing and return mail pieces. FIG. 1B is the interior side of back sheet 10. This interior side will form part of the pocket for holding the digital media.

Back sheet 10 includes the flap 11 used for sealing the mailer. On flap 11 adhesive 16 is used to seal the flap closed upon outgoing delivery. Perforated strip 14 is torn by the digital media recipient in order to open the sealed flap 11 to remove the digital media. For resealing, a covered adhesive 17 is provided. When the recipient wishes to reseal and return the mailer, a non-adhesive covering is removed from adhesive 17 and the flap 11 may be sealed again (with the upper portion of flap 11 gone from the prior opening process).

The body 12 of back sheet 10 includes a circular opening 13. Opening 13 is a hole in the sheet positioned to be in the center of the pocket region in which the digital media will be placed during outgoing and return delivery. Opening 13 viewing access to a digital media sleeve 50 from the rear side of the envelope for both outgoing and return mail pieces. A circular shaped opening is preferred because that shape is less likely to catch in postal processing equipment. However, any alternative shape may suffice.

Adhesive regions 15 along the left and right sides of back sheet body 12 are used to attach the middle sheet 20 (FIG. 2) to the back sheet 10. In between the adhesive regions 15, a pocket region 18 will be formed for holding the digital media. Accordingly, it will be important to carefully dimension the adhesive regions 15 to achieve the desired pocket region. It will be understood that the glue regions 15 may be correspondingly placed on middle sheet 20, and still have the same structural result.

Preferred dimensions for the back sheet 10 are as follows: back sheet body 12 is 7.5"×5.5"; flap 11 extends 2" from body 12; and opening 13 is 1.2" in diameter. The adhesive regions 15 are 1" wide, and the pocket region is 5.75" inches wide.

Figure 2:
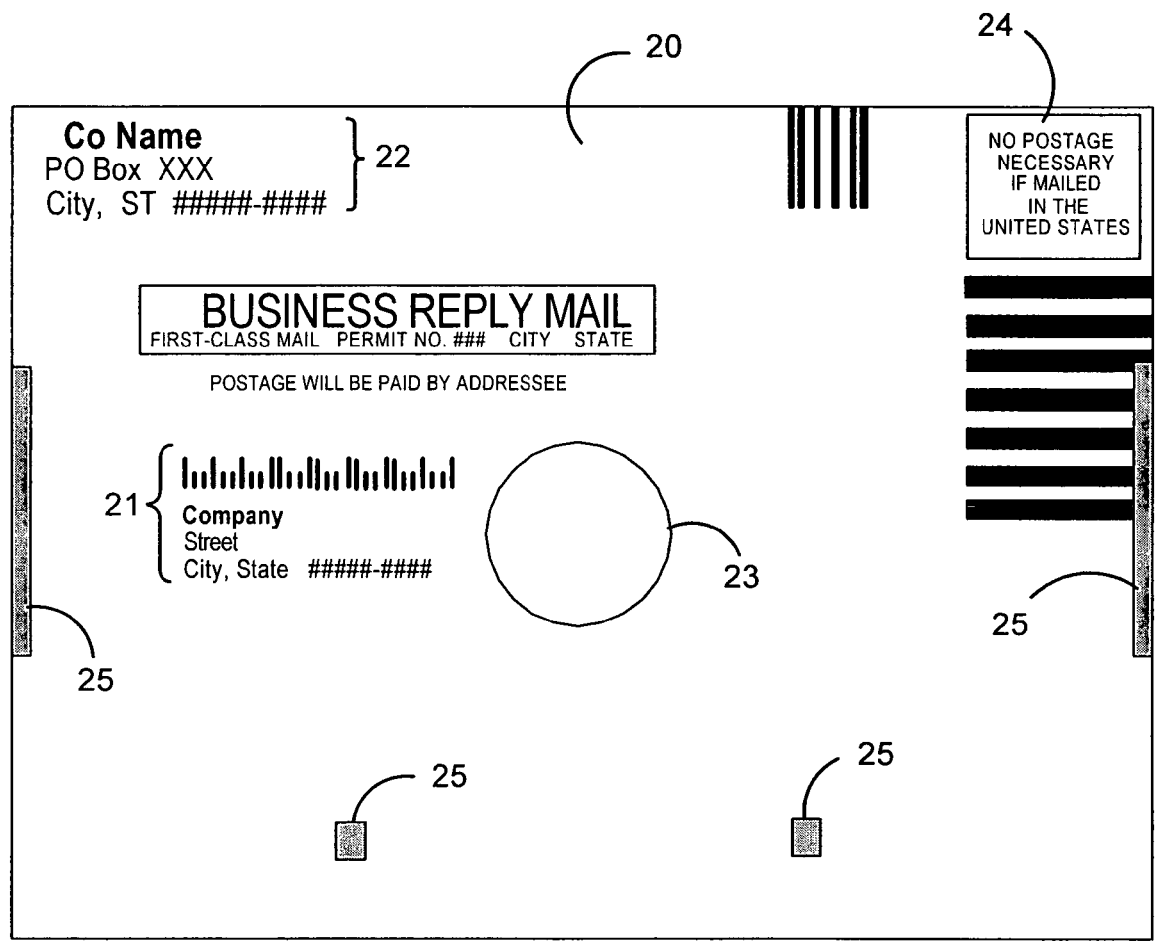
FIG. 2 depicts an exemplary middle sheet for forming a two-way mailer.
Figure 3:
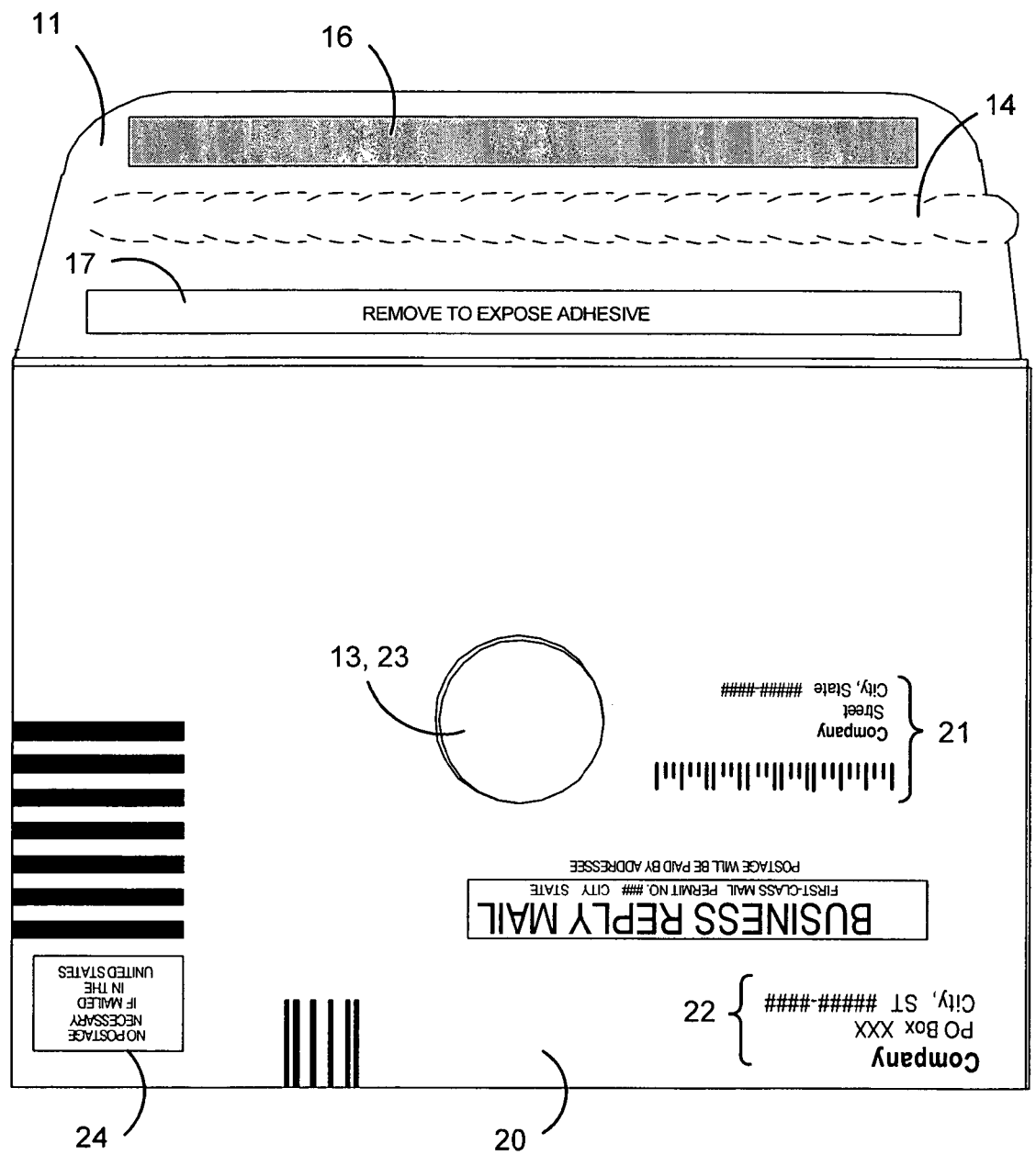
FIG. 3 depicts the combination of the exemplary back and middle sheets for forming a two-way mailer.

Middle sheet 20, depicted in FIG. 2, fits directly over the body 12 of back sheet 10, and has the same measurements. In a preferred embodiment the middle sheet 20 is placed upside down on the back sheet 10, so that when the flap 11 eventually closes it will not cover the return address 22 or postal markings 24. This combination of the back sheet 10 and middle sheet 20 is depicted in FIG. 3.

Middle sheet 20 also includes a return destination address 21, indicating where the digital media will be delivered upon return from the customer. In a first embodiment, the return destination address 21 is preprinted on middle sheet 20 prior to assembly in the mailer. Alternatively, for use in an embodiment such as depicted in FIGS. 7 and 8A-D, the return destination address 21 may initially be blank. Middle sheet opening 23 is the same size, and aligns with, back sheet opening 13. When middle sheet 20 is fastened on top of back sheet 10 a pocket region 18 is formed, and through openings 13 and 23 the contents of pocket region 18 may be viewed both from the front and back.

For attaching a top sheet 40 to the middle sheet 20, adhesive areas 25 are placed on the middle sheet 20. Adhesive areas 25 are preferably small as compared to adhesive regions 15. The reason for small adhesive areas 25 is so that a user will be able to easily remove the top sheet 40 when it is time to use the return portion of the mailer. Accordingly, a plurality of small adhesive areas 25 is preferred, as opposed to fewer and larger areas.

Figure 4:
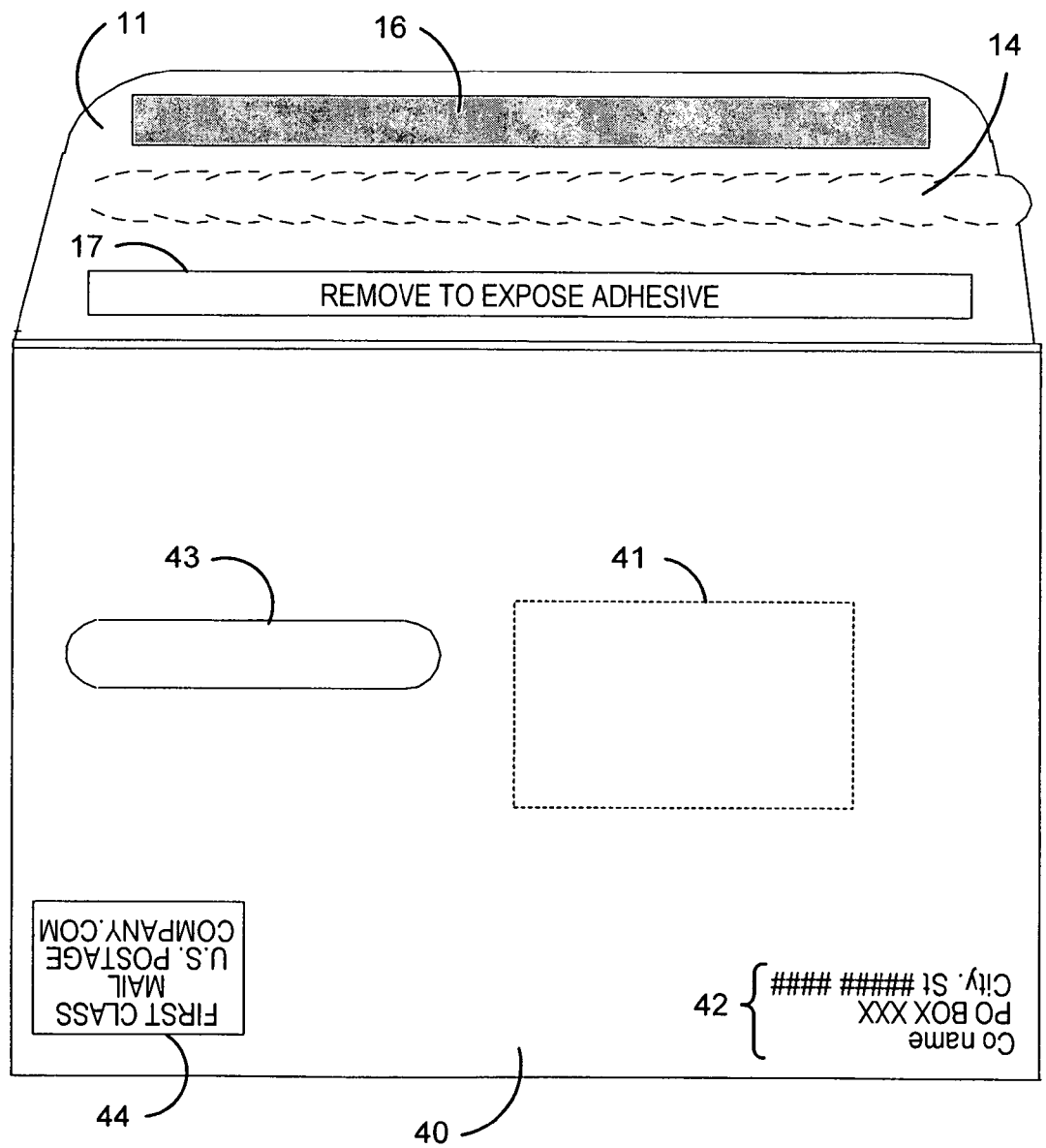
FIG. 4 depicts the combination of FIG. 3 with the addition of a removable top sheet.

FIG. 4 depicts a top sheet 40 fastened on top of the middle sheet 20. In the preferred embodiment, the delivery address region 41 is initially blank. Only after the digital media has been inserted in the mailer, the delivery address region is filled in with a customer delivery address. Return address 42 and postage markings 44 may be pre-printed, but may also be printed after the mailer is filled. Top sheet 40 also includes an opening 43 to allow scanning of information on the middle sheet 20.

Figure 5:
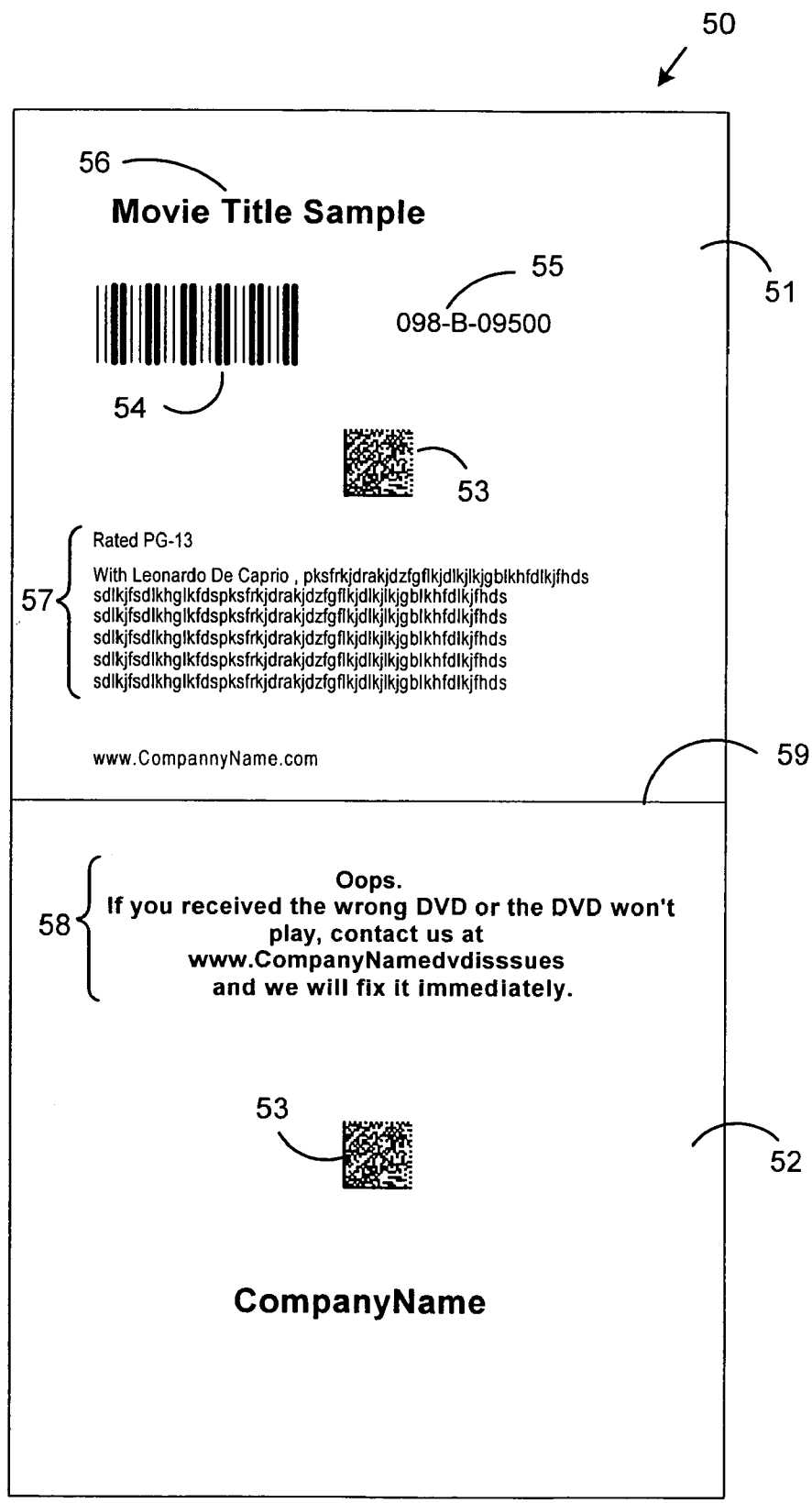
FIG. 5 depicts an exemplary front and back of a sleeve for holding digital media disks.

FIG. 5 depicts a digital media sleeve 50 having a front face 51 and a back face 52. In this particular example, the sleeve is comprised of a single sheet separated by a folding line 59. It will be understood that any configuration of sleeve will suffice, so long as it fits in the pocket region 18. An important feature of the sleeve 50 is the 2-D barcode 53 positioned in the center of each side of the sleeve 50. Barcode 53 is preferably ½ inch square. This barcode 53 includes an identification of the content of the digital media contained in the sleeve 50, for example the DVD movie title, or a serial number for a particular copy of the DVD. Such information may also be include in supplementary 1-D barcode 54 or plain text code 55. The sleeve 50 further preferably includes a plain text title 56 for the media content, along with detailed descriptions 57 and instruction messages 58.

Figure 9A:
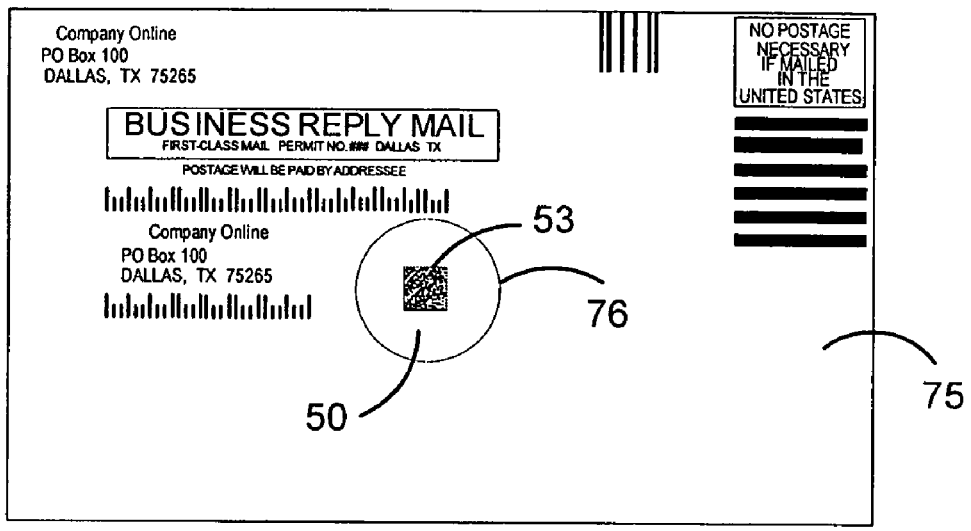
FIGS. 9A and 9B depict an exemplary return portion of the mailer with the digital media sleeve enclosed.
Figure 9B:
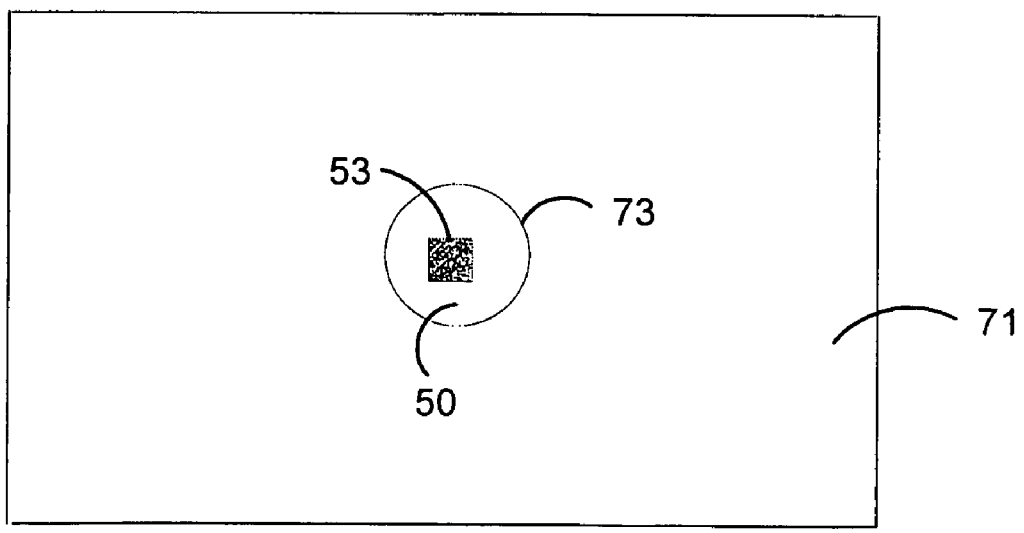

By positioning the barcode 53 in the center faces of generally square sleeve 50, and by positioning the openings 13 and 23 generally in the center of the pocket region 18 between the back and middle sheets 10 and 20, it is assured that the barcodes 53 can be easily scanned for outgoing and incoming pieces, without opening the mailer. As a result, more streamlined processes may be applied by a rental service for incoming mail whereby time critical DVD's can be identified sooner, without the need to open the pieces. Also, for outgoing pieces, automated processes for inserting and addressing DVD's can be controlled by scanning of the sleeve barcode 53. FIGS. 9A and 9B show an exemplary return portion of a two-way mailer, with the sleeve barcode 53 showing through openings 73 and 76.

It should be understood the requirement of placing the barcode 53, or openings 13 and 23, in their respective center positions on the sleeve 50 or pocket region 18 does not require a strict geometrically calculated center. Rather, the size of the openings 13 and 23 and the smaller size of the barcode 53 may allow for a margin of error in placement such that they may be considered centered for purposes of this invention. What matters most is that the barcode 53 be visible through the openings 13 and 23, regardless of the orientation of how the sleeve 50 is placed in the pocket.

Figure 6:
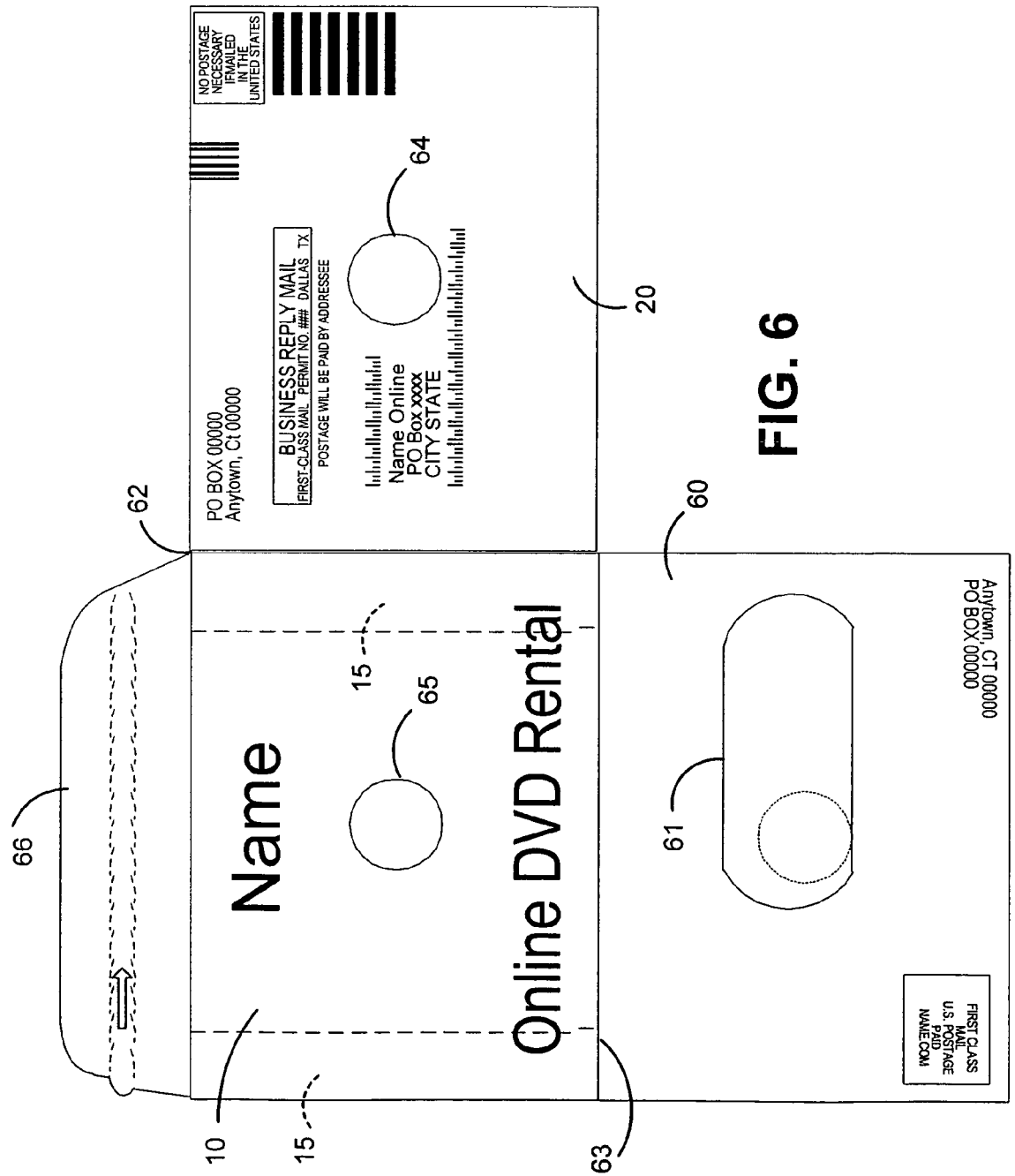
FIGS. 6-7 depicts alternative arrangements for forming two-way mailers.

FIG. 6 depicts an alternative embodiment for constructing the mailer, having two main differences from what was described previously. First, the sheets 10, 20 and 60 forming the mailer are formed from a single sheet. In this arrangement, middle sheet 20 would first be folded along line 62 to be fixed along the adhesive regions 15 of the back sheet 10. Then, top sheet 60 could be folded along fold line 63 to be affixed on top of the middle sheet 20. Line 63 may be perforated to facilitate removal of top sheet 60 prior to sending the return mail piece.

Alternatively, sheet 20 be switched with sheet 60, so that the top of middle sheet 20 is along fold line 63, while the edge of top sheet 60 is along fold line 62. As another acceptable variation, sheets 10 and 20 may be formed from a single sheet, while top sheet 60 is formed from a separate sheet.

The other structural difference depicted in FIG. 6 is the placement of opening 61. Top sheet opening 61, when folded over middle sheet 20 allows access to the opening 23 and to the return address destination region 21. By exposing the return address destination region 21, it is possible scan the sleeve barcode 53 and to print the return address destination 21 while the mailer is being assembled, and after the media is inserted. This arrangement is discussed further below in connection with FIGS. 8A-D.

Figure 7:
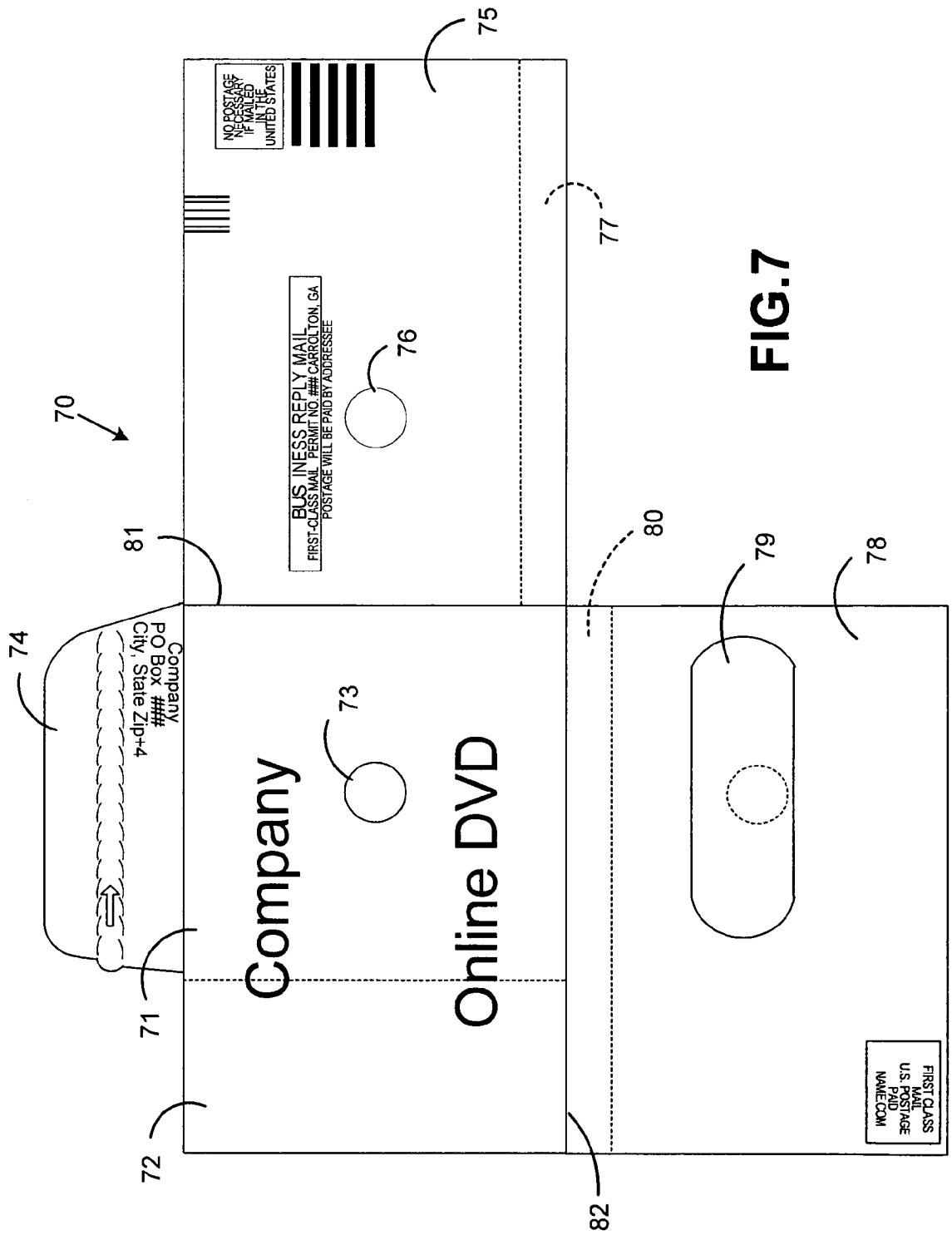

FIG. 7 depicts another alternative embodiment for assembly of the two-way mailer. The distinguishing feature of this embodiment is that the pocket region not centered in the mailer, but is instead towards the side away from the postage markings. That side is chosen because the side with the postage markings is typically the lead edge for postal service handling equipment, and positioning the media towards a trailing edge is better for protecting the media from being damaged.

Accordingly, middle sheet 75 with opening 76 is folded along line 81 to be fixed on top of back sheet 71. Glue regions 72 and 77 attach the middle sheet 75 to the back sheet 71. Top sheet 78, with opening 79 is folded along line 82 to be fixed on top of middle sheet 75. Top sheet 78 may also include one or more glue regions, such as region 80. Flap 74 may be of a reduced size, so as to only extend horizontally across the pocket region.

Figure 8A:
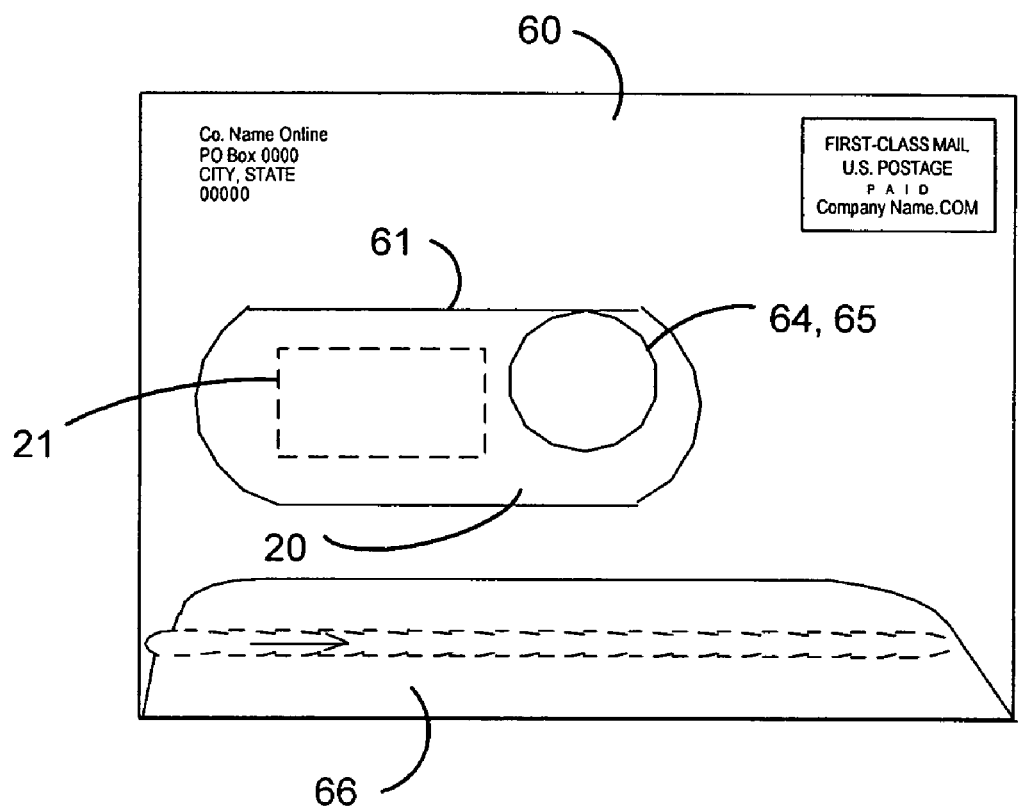
FIGS. 8A-8D depict components and finished assembly of one of the alternative arrangements.
Figure 8B:
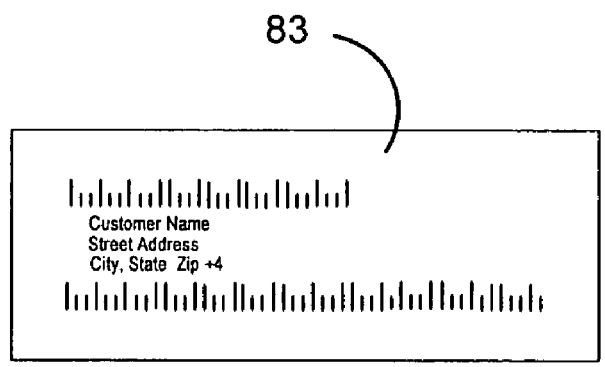
Figure 8C:
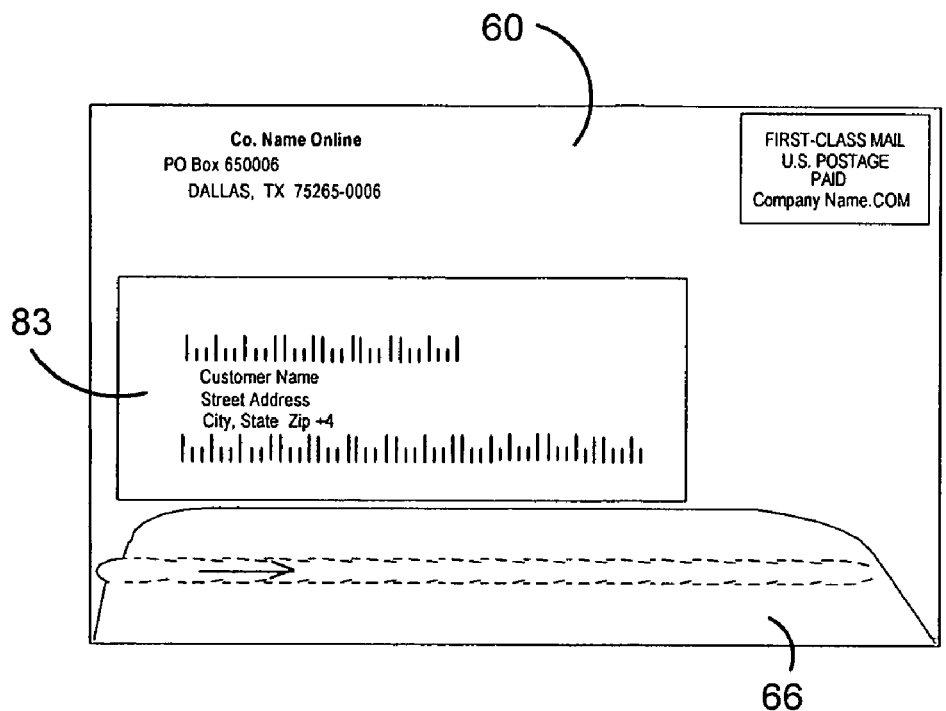
Figure 8D:
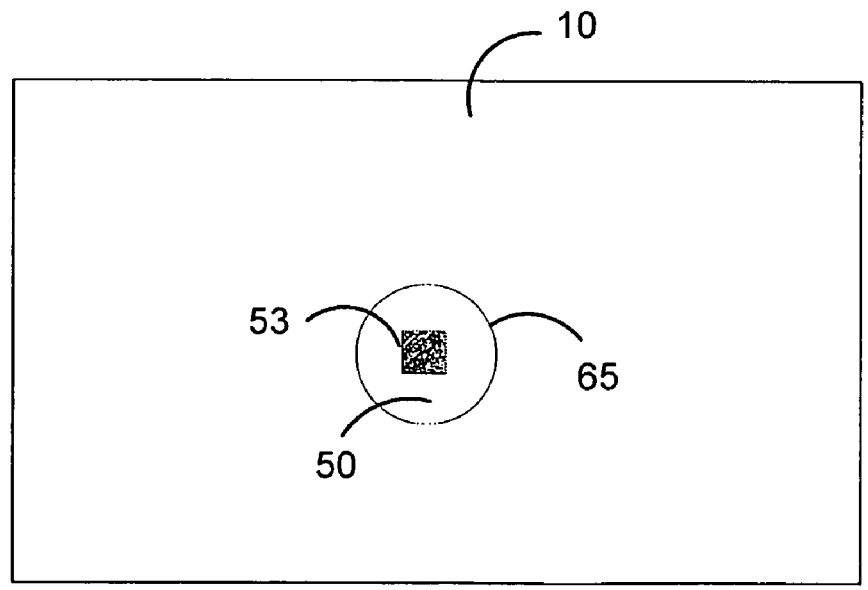

FIGS. 8A depicts a partially constructed mailer similar to that shown in FIG. 7. In FIG. 8A the return delivery address region 21 has been left blank on the middle sheet 20. Also, the opening 61 has taken the place where normally an outgoing delivery address would have been printed. To finish mailer shown in this embodiment, a printer prints the return delivery address on the region 21 through the opening 61. Next, an outgoing delivery address is printed on a label 83 as depicted in FIG. 8B. The label 83 is then place on the top sheet 60 over the opening 61 as depicted in FIG. 8C. For completeness, FIG. 8D shows a rear view of the mailer with the sleeve 50 and barcode 53 showing through the opening 65.

The present invention may be used with paper and adhesives known in the art. As a particular example, paper and adhesive identified in co-pending U.S. patent application Ser. No. 10/937,108, Two-Way Electronic Media Mailer, filed Sep. 9, 2004, may also be used for the present invention.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A mailer for delivery of a digital media disk, the mailer comprising:
   a back sheet having a back sheet opening and a reclosable closing flap;
   a middle sheet having a middle sheet opening, the middle sheet fastened on top of the back sheet such that the middle sheet opening aligns with the back sheet opening, and whereby a disk receiving slot is formed between the back sheet and the middle sheet, the disk receiving slot dimensioned to enclose the digital media disk, the aligned openings located in a center of the disk receiving slot, a top face of the middle sheet including return mail markings; and
   a top sheet removable attached on top of the middle sheet, a top face of the top sheet including mailing markings, the closing flap of the back sheet folding into a closed position over the top sheet and the middle sheet.

2. The mailer of claim 1 further comprising a digital media sleeve for enclosing the digital media disk, the sleeve dimensioned to fit within the disk receiving slot, the sleeve having an identification code printed on a front center and a back center of the sleeve, thereby positioned so that the identification code is visible through both the back sheet opening and the middle sheet opening when the sleeve is placed within the disk receiving slot.

3. The mailer of claim 2 wherein the identification code is a barcode that indicates content of the digital media.

4. The mailer of claim 3 wherein the sleeve further include plain text information indicating content of the digital media.

5. The mailer of claim 1 wherein the back sheet, the middle sheet and the top sheet are comprised of separate sheets, and wherein the middle sheet is adhered to the back sheet along adhesive regions at a left side and along a right side of the mailer, the disk receiving slot being formed by an unadhered space between the back and middle sheets and between left and right adhesive regions.

6. The mailer of claim 1 wherein an opening for the disk receiving slot is along a side of the fastened middle sheet where the flap of the back sheet is located, whereby folding closed of the flap results in closing an opening for the disk receiving slot.

7. The mailer of claim 1 wherein the top sheet includes an opening allowing viewing of at least some of the return mail markings when the top sheet is attached over the middle sheet.

8. The mailer of claim 7 wherein the return mail markings on the middle sheet, viewable through the opening in the top sheet, includes customer account information.

9. The mailer of claim 8 wherein the marking including the customer account information comprise a bar code.

10. The mailer of claim 1 wherein the top sheet include a top sheet opening that overlaps with the middle sheet opening when the top sheet is attached over the middle sheet, the top sheet opening further encompassing and allowing access to an reply address region on the middle sheet.

11. The mailer of claim 10 wherein the top sheet opening is covered by a delivery address label attached to the top sheet.

12. The mailer of claim 1 wherein the top sheet is removably attached to the middle sheet by adhesive regions located around outer regions between the top and middle sheets.

13. The mailer of claim 1 wherein the back sheet and the middle sheet are made from a single sheet that is folded and adhered so that the middle sheet lies on top of back sheet.

14. The mailer of claim 13 wherein the top sheet is also formed from the single sheet and the top sheet shares an edge with the middle sheet so that the top sheet can be folded and adhered so that the top sheet lies on top of the folded and adhered middle sheet.

15. The mailer of claim 14 wherein the middle sheet is adhered to the back sheet along an adhesive region distal from a folded edge joining the middle and back sheets, the disk receiving slot being formed by an unadhered space between the back and middle sheets and between the distal adhesive region and the folded edge.

16. The mailer of claim 15 wherein an opening for the disk receiving slot is along a side of the fastened middle sheet where the flap of the back sheet is located, whereby folding closed of the flap results in closing an opening for the disk receiving slot.

17. The mailer of claim 16 whereby the flap is positioned contiguous with the opening for the disk receiving slot, and does not extends horizontally beyond a width of the disk receiving slot.

18. The mailer of claim 1 wherein the reclosable closing flap of the back sheet includes
   a first horizontal adhesive strip positioned distally from a main body of the back sheet;
   a second horizontal adhesive strip with a removable covering positioned proximally to the main body of the back sheet; and
   a horizontal perforated tear strip extending across the horizontal width of the flap and positioned between the first and second horizontal adhesive strips;

whereby the first horizontal adhesive strip adheres to the top sheet to close the mailer as an outgoing mail piece, the perforated tear strip is used to open the mailer upon receipt by a recipient, and the second horizontal adhesive strip adheres to the middle sheet, after removal of the top sheet, to close the mailer as a return mail piece.

19. The mailer of claim 1 wherein markings are positioned on the middle and top sheets such that when the reclosable closing flap oriented at a top position of the mailer, the markings are oriented upside-down.

* * * * *